Jan. 9, 1940. O. K. HOGLUND ET AL 2,186,912
METHOD OF PROVIDING PLANT CONTAINERS
Filed Nov. 17, 1938
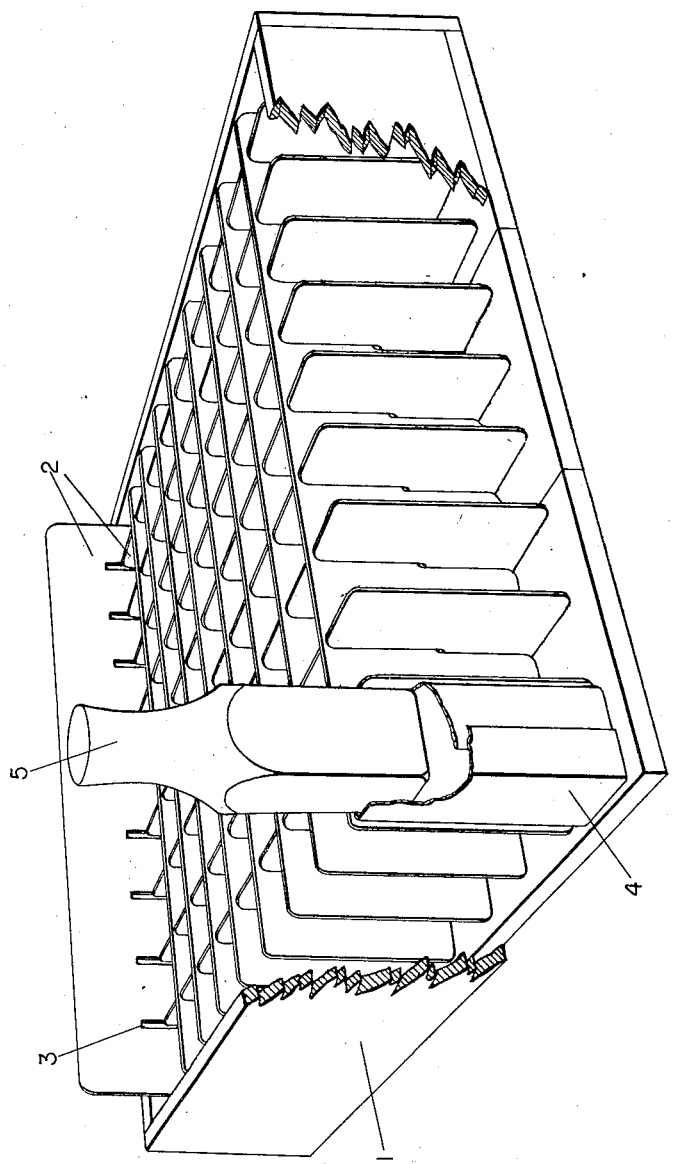
Inventors
Oswald K. Hoglund
Fred W. Herbert
By
Attorneys

UNITED STATES PATENT OFFICE 2,186,912

METHOD OF PROVIDING PLANT CONTAINERS

Oswald K. Hoglund and Fred W. Herbert, Santa Paula, Calif.; dedicated to the free use of the People of the United States Application November 17, 1938, Serial No. 240,946

1 Claim. (Cl. 93—37)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

We hereby dedicate the invention herein described to the free use of the People of the United States to take effect on the granting of a patent to us.

This invention relates to plant propagation and is more particularly concerned with an improved method for making plant containers out of paper or other suitable flexible material into which seeds may be planted or seedling plants transferred to be grown until such time as it is desired to transplant them to larger containers. The method is especially adapted to regular nursery production and it also has an important use in soil conservation work where it is desired to grow large quantities of plants for transplanting to soil erosion or potential soil erosion areas.

The drawing accompanying this specification is a perspective view of the various parts necessary to carry out the steps in this process wherein the numeral 1 designates a tray into which a plurality of partition strips 2 having vertical slots 3 are removably interlocked in spaced relation so as to form a plurality of compartments of equal size. The partition strips in one direction have their slotted portions extending upward and the partition strips transverse thereto have their slotted portions extending downward.

Strips of flexible material 4, such as asphalt treated paper, paraffin dipped paper, or the like, of sufficient length to provide an overlap and having a width substantially equal to the depth of the compartments, are manually shaped into cylinders and inserted in the compartments. These strips are then made to conform to the lateral sides of the compartments by means of a shaper tool 5 inserted therein. This shaper tool has a tapered die portion which fits into each compartment in such a manner that it spreads the flexible cylinders outward to conform to the lateral interior surfaces of the compartments. This forms a receptacle, which is then filled with soil. If desired, before filling the receptacles with soil, they can be just partially filled and tamped down to make them more conforming to the compartments. The metal strips 2 are then removed by simply lifting them out. First, all of the strips having their slots extending downward are removed and then all of the others. These metal strips may then be used for another tray.

Thus the tray is filled with individually soil-filled receptacles into each of which a seed may be planted or a seedling plant transferred.

When the plants have grown in these individual receptacles for a sufficient length of time and are ready for transplanting to permanent locations, one side of the tray is removed and the plants are taken out of the tray individually with their respective containers by means of a wide spatula. If the plants are allowed to mature long enough the root distribution obtained by this method, together with the compactness of the soil, is sufficient to hold the soil together without keeping the strips of material 4 around them.

Having thus described our invention, we claim:

The method of providing a plurality of individual plant containers in a seed tray, said method comprising the formation of a plurality of unit compartments in said tray by means of removably interlocking transverse slotted strips, molding a flexible sheet material to conform to the lateral interior surfaces of said unit compartments, and removing said slotted strips from said tray.

OSWALD K. HOGLUND.
FRED W. HERBERT.